(12) United States Patent
Wang et al.

(10) Patent No.: US 11,573,718 B2
(45) Date of Patent: Feb. 7, 2023

(54) DISAGGREGATION OF CONTROL PATH AND DATA PATH

(71) Applicant: Western Digital Technologies, Inc., San Jose, CA (US)

(72) Inventors: Qingbo Wang, Irvine, CA (US); Martin Lueker-Boden, Freemont, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 15 days.

(21) Appl. No.: 17/175,170

(22) Filed: Feb. 12, 2021

(65) Prior Publication Data

US 2022/0261165 A1 Aug. 18, 2022

(51) Int. Cl.
*G06F 12/00* (2006.01)
*G06F 3/06* (2006.01)

(52) U.S. Cl.
CPC ............ *G06F 3/0635* (2013.01); *G06F 3/067* (2013.01); *G06F 3/0619* (2013.01); *G06F 3/0659* (2013.01)

(58) Field of Classification Search
CPC .... G06F 3/0635; G06F 3/0619; G06F 3/0659; G06F 3/067
USPC ........................................................ 711/154
See application file for complete search history.

(56) References Cited

U.S. PATENT DOCUMENTS

| 5,922,077 A * | 7/1999 | Espy ..................... G06F 11/201 714/E11.085 |
| 7,685,628 B2 * | 3/2010 | Fukui ..................... H04L 9/083 726/4 |
| 10,503,590 B2 | 12/2019 | Koltsidas et al. |
| 10,725,941 B2 | 7/2020 | Subbarao et al. |
| 2005/0120259 A1 * | 6/2005 | Aoki ................... G06F 11/2028 714/4.11 |
| 2018/0341606 A1 | 11/2018 | Bolkhovitin et al. |
| 2019/0286352 A1 | 9/2019 | Olarig |
| 2019/0294373 A1 | 9/2019 | Lee et al. |
| 2019/0320020 A1 | 10/2019 | Lee et al. |
| 2020/0301618 A1 | 9/2020 | Olarig |
| 2022/0001279 A1 * | 1/2022 | Colenbrander ....... A63F 13/352 |

* cited by examiner

*Primary Examiner* — Mardochee Chery
(74) *Attorney, Agent, or Firm* — Barry IP Law, P.C.

(57) ABSTRACT

A network device includes at least one control path port and data path ports configured to communicate on a network. A connection request is received from a host via a control path port, and a resource of the network device is allocated to the host. A data path port is determined from among the plurality of data path ports for communication between the host and the allocated resource. An indication of the determined data path port is sent to the host via the control path port for communication on a data path between the host and the allocated resource. In one aspect, a network interface includes at least one control path port and a first plurality of data path ports configured to communicate on a network. A connection request is received from a host via a control path port, and a locally connected device is allocated to the host.

20 Claims, 6 Drawing Sheets

DISAGGREGATION OF CONTROL PATH AND DATA PATH

BACKGROUND

Current trends in cloud computing, big data, and Input/Output (I/O) intensive applications have led to greater needs for high performance distributed shared memory and storage systems in data centers in terms of low latency, high throughput, and bandwidth. Emerging high-performance Non-Volatile Memory express (NVMe) storage devices, such as Solid-State Drives (SSDs), are becoming more common due to their increased performance in terms of Input/Output Operations Per Second (IOPS). Although NVMe was originally designed to be used with a Peripheral Component Interconnect express (PCIe) interface within a computer, recent NVMe extensions such as NVMe over Fabric (NVMeoF) can support remote access to NVMe devices as well as non-NVMe devices, such as with Remote Direct Memory Access (RDMA) (e.g., RDMA over Converged Ethernet (RoCE) and iWarp) and Fibre Channel (FC) transport fabrics.

A network device, such as a server, can include Data Storage Devices (DSDs) that are each connected to a PCIe switch (or Host Bus Adapter (HBA)) and Network Interface Card or to an Ethernet switch including ports for communication on a network. A processor of the network device, such as an Application-Specific Integrated Circuit (ASIC) or a Central Processing Unit (CPU), may execute a target driver to handle NVMeoF packet processing for the DSDs in the network device. However, the control path processing of managing the communications between the DSDs of the network device with multiple layers of protocols, such as NVMe and Transmission Control Protocol (TCP) can become a bottleneck in slowing NVMeoF communications between the network device and hosts via the network when sharing network ports with data path processing.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Network Devices

Figure 1:
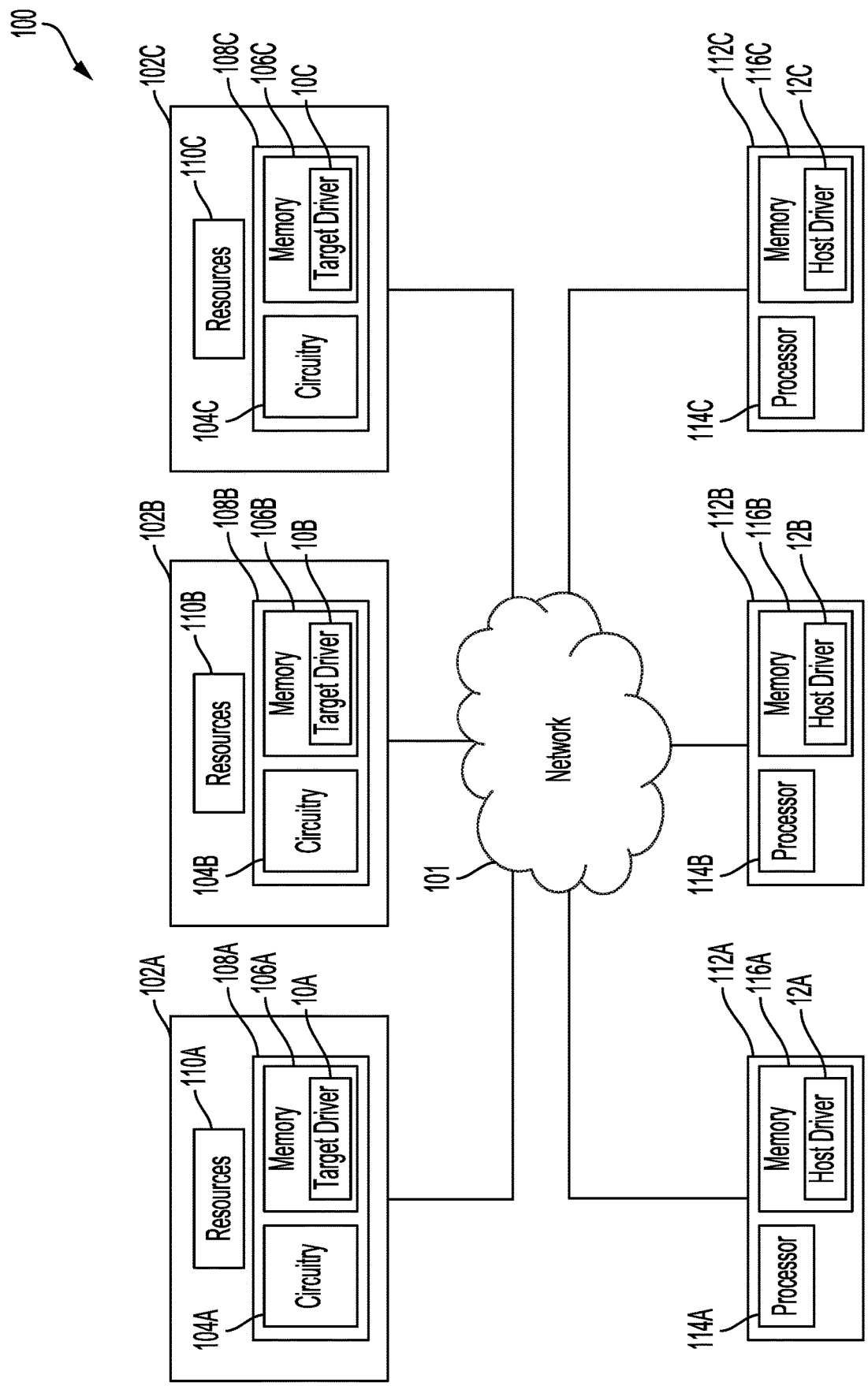
FIG. 1 illustrates an example network environment for implementing control path and data path disaggregation according to one or more embodiments.

FIG. 1 illustrates example network environment 100 for implementing control path and data path disaggregation according to one or more embodiments. In the example of FIG. 1, network devices 102A, 102B, and 102C communicate with hosts 112A, 112B, and 112C via network 101. In some implementations, network devices 102 may also communicate with each other such that one network device 102 may act as a host by sending and/or receiving data from another network device 102. As discussed in more detail below, network devices 102 provide access to resources 110 of the network devices 102 to external devices (e.g., hosts 112) via network 101.

Network devices 102 can include, for example, servers that include one or more Data Storage Devices (DSDs) as resources 110, such as Solid-State Drives (SSDs) and/or Hard Disk Drives (HDDs). In other implementations, network devices 102 can include other hardware resources such as memory (e.g., Dynamic Random-Access Memory (DRAM) or Storage Class Memory (SCM)) and/or processors to serve as a compute node or distributed cache server in network environment 100. In yet other implementations, network devices 102 can provide a software resource to an external device in network environment 100, such as remote use of an application or process executing on a processor of the network device 102.

Hosts 112 can include, for example, clients or compute nodes that include one or more processors, such as Reduced Instruction Set Computer (RISC)-V cores and/or Central Processing Units (CPUs) that execute applications that use data stored in the DSDs of network devices 102. In some implementations, and as noted above, network devices 102 may include additional or different resources than DSDs, such as processing or memory resources, or software resources.

In some implementations, network environment 100 in FIG. 1 may be used as at least part of a data center and/or for distributed processing, such as for distributed machine learning or big data analysis. As will be appreciated by those of ordinary skill in the art, network devices 102 and hosts 112 are shown for the purposes of illustration, and network environment 100 can include many more network devices 102 and/or hosts 112 than those shown in FIG. 1. In addition, those of ordinary skill in the art will appreciate that network environment 100 can include additional components than shown in FIG. 1, such as aggregated switches, Top of Rack (ToR) switches, and network controllers, for example.

Network 101 can include, for example, a Storage Area Network (SAN), a Local Area Network (LAN), and/or a Wide Area Network (WAN), such as the Internet. In this regard, some or all of network devices 102A, 102B, and 102C may not be in the same geographic location as each other, or may not be in the same geographic location as some or all of hosts 112A, 112B, and 112C. Network devices 102 and hosts 112 may communicate using one or more standards such as, for example, Ethernet.

Hosts 112A, 112B, and 112C include processors 114A, 114B, and 114C, respectively, and memories 116A, 116B, and 116C, respectively. Processors 114 can execute instructions, such as instructions from an application executing in a user space of a host 112, or as part of an Operating System (OS) used by the host 112. Host drivers 12A, 12B, and 12C can facilitate communication between hosts 112 and network devices 102. In some implementations, a host driver 112 can include part of an OS of a host 112.

Processors 114 can include circuitry such as, for example, a CPU, a Graphics Processing Unit (GPU), a microcontroller, a Digital Signal Processor (DSP), an Application-Specific Integrated Circuit (ASIC), a Field Programmable Gate Array (FPGA), one or more RISC-V cores, hard-wired logic, analog circuitry and/or a combination thereof. In some implementations, processors 114 can include a System on a Chip (SoC), which may be combined with a memory 116.

Memories 116 can include, for example, a volatile Random-Access Memory (RAM) such as Static RAM (SRAM), DRAM, a non-volatile RAM, or other solid-state memory that is used by processors 114. Data stored in memory 116 can include data retrieved from a network device 102, data to be stored in a network device 102, instructions loaded from an application for execution by a processor 114, and/or data used in executing such applications.

In some implementations, memory 116 can include, for example, one or more rotating magnetic disks, or non-volatile solid-state memory, such as flash memory. In such implementations, memory 116 may include one or more DSDs such as one or more SSDs and/or HDDs. While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 116 may include an SCM, such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

As shown in FIG. 1, network devices 102A, 102B, and 102C include resources 110A, 110B, and 110C, respectively, and network interfaces 108A, 108B, and 108C, respectively. Networked resources 110 can include storage, processing, and/or memory resources that can be accessed by hosts 112 via network 101. As discussed in more detail below, each network interface 108 includes at least one dedicated control path port (e.g., control path ports 118A in FIG. 2, control path ports 118B in FIG. 3, and dedicated control path ports 118C in FIG. 4) and a plurality of data path ports (e.g., data path ports 120A in FIG. 2, data path ports 120B in FIG. 3, and data path ports 120C in FIG. 4). The control path ports are dedicated in the sense that the control path ports are reserved for control plane operations, such as managing or controlling data path connections with external devices (e.g., hosts 112). Similarly, the data path ports are dedicated in the sense that the data path ports are reserved for data plane operations, such as sending and receiving messages or packets including data payloads sent to or retrieved from network devices 102.

The control path ports can be exposed or published by network devices 102 for communication in network environment 100 and used to establish or set up data paths between hosts 112 and network devices 102 via an assigned or determined data path port. The control path ports can be used for managing, for example, device discovery on network 101, error handling for messages sent via a data path port, and negotiating network parameters with a host 112 for data path communication. Such negotiated parameters can include, for example, a protocol version to be used for communication (e.g., Non-Volatile Memory express (NVMe) 1.4), a data offset alignment from the start of a Protocol Data Unit (PDU), a bitmask used for a header or data digest for ensuring data integrity, a maximum data length, a permission level (e.g., read only, read/write permission), and/or a maximum number of credits allowed for data message flow control.

By disaggregating or separating control path communication and data path communication on different ports, it is ordinarily possible to improve the throughput and bandwidth of network devices 102 in receiving data from and sending data to hosts 112. In more detail, such disaggregation of control path and data path communications can better distribute the usage of available network ports and take advantage of the switching capability of network devices 102 so that the management of the communication links or data paths does not become a bottleneck for the data plane.

In the example of FIG. 1, network interfaces 108A, 108B, and 108C of network devices 102 include circuitry 104A, 104B, and 104C, respectively, and memories 108A, 108B, and 108C, respectively. Circuitry 104 can include, for example, a general-purpose CPU, a Data Processing Unit (DPU), as in the example of FIG. 3 discussed below, or a programmable switch, as in the example of FIG. 4 discussed below. A DPU may include, for example, an Mellanox BlueField-2 DPU. A programmable switch may include, for example, P4 programmable switches, such as a Barefoot Networks Tofino Application Specific Integrated Circuit (ASIC) with ports configured to provide 40/100 Gigabit Ethernet (GE) frame rates, a Cavium Xpliant programmable switch, or a Broadcom Trident 3 programmable switch.

In some implementations, circuitry 104 may include a router or a Peripheral Component Interconnect express (PCIe) switch, rather than an Ethernet switch, or may include other types of circuitry such as one or more smart Network Interface Cards (NICs), network interface controllers, or network adapters that can be programmed using a programming language, such as P4. For example, circuitry 104 can include smart NICs, such as a Netronome Agilio NIC, a Mellanox NIC, or a Broadcom Stingray NIC. In some implementations, circuitry 104 may include processors such as CPUs, GPUs, and/or ASICs for managing communication with hosts 112.

Memories 108 of network devices 102 can include, for example, a volatile RAM such as SRAM, DRAM, a non-volatile RAM, Content Addressable Memory (CAM), Ternary CAM (TCAM), registers, or other solid-state memory that is used by circuitry 104. Data stored in memory 108 can include data for processing messages or packets, data extracted from such messages or packets, instructions loaded from an application for execution by circuitry 104, and/or data used in executing such applications.

Target drivers 10A, 10B, and 10C stored in memories 108A, 108B, and 108C, respectively, can provide control path processing and management of a data path to perform, for example, NVMe and/or Transmission Control Protocol (TCP) processing. In addition, target drivers 10 can be used by circuitry 104 to set up or establish data paths with hosts 112, as in the example processes of FIGS. 5 and 7 discussed below, and to handle data path failures, as in the example process of FIG. 6 discussed below. In some implementations, target drivers 10 may form part of an OS used by network interfaces 108.

Those of ordinary skill in the art will appreciate with reference to the present disclosure that other implementations may include a different number or arrangement of network devices 102 or hosts 112 than shown in the example of FIG. 1. In this regard, network environment 100 shown in FIG. 1 is for the purposes of illustration, and those of ordinary skill in the art will appreciate that network environment 100 may include many more network devices 102 and hosts 112, or may include additional components, such as routers and switches, than shown in the example of FIG. 1. As another example variation, network devices 102 may include a combined memory 108 and circuitry 104, such as in a programmable switch (e.g., network interface 108C in FIG. 4), or hosts 112 may also include local DSDs such as an SSD or HDD.

Figure 2:
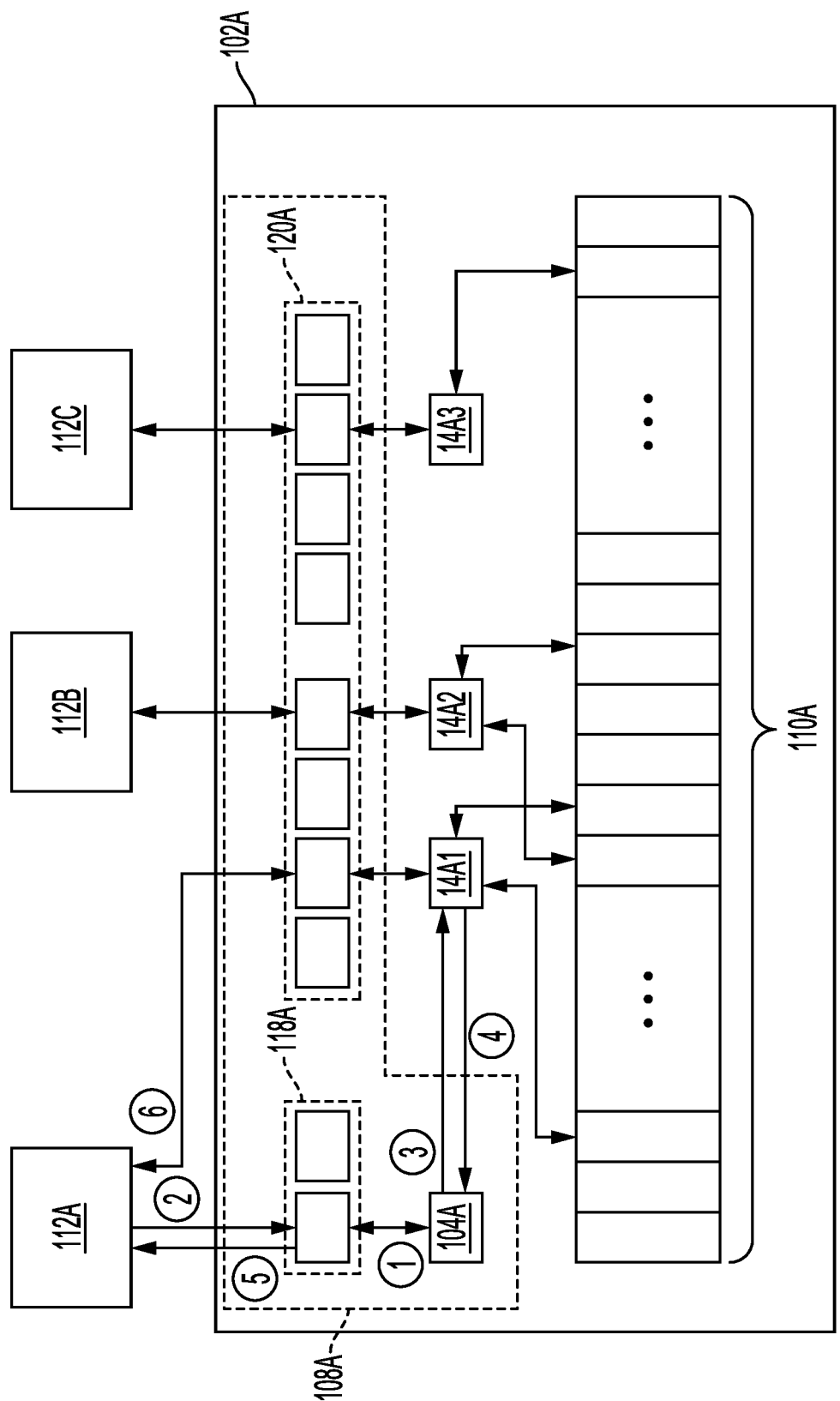
FIG. 2 is a block diagram illustrating control path and data path communications for an example network device according to one or more embodiments.

FIG. 2 is a block diagram illustrating an example sequence of control path and data path communications for network device 102A according to one or more embodiments. As shown in FIG. 2, network interface 108A of network device 102 includes dedicated control path ports 118A, dedicated data path ports 120A, and circuitry 104A. The sequence of communications begins at the encircled "1" in FIG. 2 with circuitry 104A monitoring control path ports 118A for communications received from hosts 112 or other external devices. Control path ports 118A are the only ports of network device 102A that are published or exposed on the network for network device 102A. As a result, new connection requests from hosts 112, such as for a read request for data stored in network device 102A or a write request to store data in network device 102A, are initially received from the hosts 112 by network device 102A via control path ports 118A.

As indicated at "2" in FIG. 2, network device 102A receives a connection request from host 112A via a control path port 118A. Circuitry 104A at "3" in FIG. 2 then executes process 14A1 to allocate a resource of network device 102A based on the received request and to determine a data path port of data path ports 120A for communication between host 112A and the allocated resource. In some implementations, process 14A1 may be a newly spawned process or thread. Alternatively, process 14A1 may be an idle process or thread executed by circuitry 104A for allocating a resource of network device 102A.

Process 14A1 may allocate the resource based on, for example, at least one of a message type, a storage protocol, and a priority indicated by host 112A. For example, the connection request received from host 112A may specify a storage protocol, such as Key-Value (KV) or Zoned Namespace (ZNS), or may indicate the use of a particular data communication protocol, such as NVMe. Process 14A1 may then identify a particular DSD of resources 110A to allocate to host 112A that uses the specified storage protocol or message type. In another example, process 14A1 may identify a particular resource of resources 110A that has more than a threshold level of available memory and/or processing resources, or that meets an availability or Quality of Service (QoS) criterion for the resource (e.g., less than a threshold number of pending commands in a queue) based on a priority indicated by the connection request, such as by an 802.1 Qbb priority tag included in an Ethernet packet for the connection request.

Resources 110A may include a hardware resource of network device 102A, such as, a DSD, a processor (e.g., a CPU, GPU, ASIC, or FPGA), or a memory (e.g., DRAM or SCM). In other implementations, resources 110A may include software resources of network device 102A, such as the remote use of an application or process executing on a processor of network device 102A.

In determining the data path port to use for the data path communication with host 112A, process 14A may use a data path port that is statically assigned or connected to the allocated resource. In other implementations, process 14A may dynamically assign or bind a data path port to use for the data path communication from among a plurality of data path ports of data path ports 120A. In some implementations, data path ports of data path ports 120A may be monopolized by a particular process 14A or a data path port may be concurrently shared by multiple processes 14A.

After allocating the resource and determining the data path port to use, process 14A1 at "4" provides circuitry 104A with data port information for the determined data path port. In some implementations, process 14A1 may also provide other configuration information, such as an identifier for the allocated resource, such as a Logical Unit Number (LUN) or a range of logical or physical addresses used for allocated storage or memory.

The data port information is then provided at "5" to host 112A via a control path port 118A by network interface 108A, which may provide other configuration information to host 112A. The data port information can include a particular unpublished or hidden port address or identifier for network device 102A to enable data path communications with the allocated resource 110A. With the data port information, host 112A and the allocated resource 110A can send and/or receive data messages at "6" in FIG. 2. The exchanged data messages can include, for example, one or more sequences of NVMeoF messages for retrieving data from the allocated resource, storing data in the allocated resource, sending data to be processed by the allocated resource, and/or obtaining a result of data processed by the allocated resource.

As shown in the example of FIG. 2, circuitry 104A may use other processes, such as 14A2 and 14A3 to allocate one or more resources of resources 110A to hosts, such as hosts 112B and 112C. In addition, and as with the example of process 14A1 in FIG. 2, multiple resources of resources 110A may be allocated to a single host 112 for data path communication via a determined data path port of data path ports 120A.

As will be appreciated by those of ordinary skill in the art with reference to the present disclosure, other arrangements of a network device 102A are possible. For example, FIGS. 3 and 4 discussed below provide different examples of a network device 102.

Figure 3:
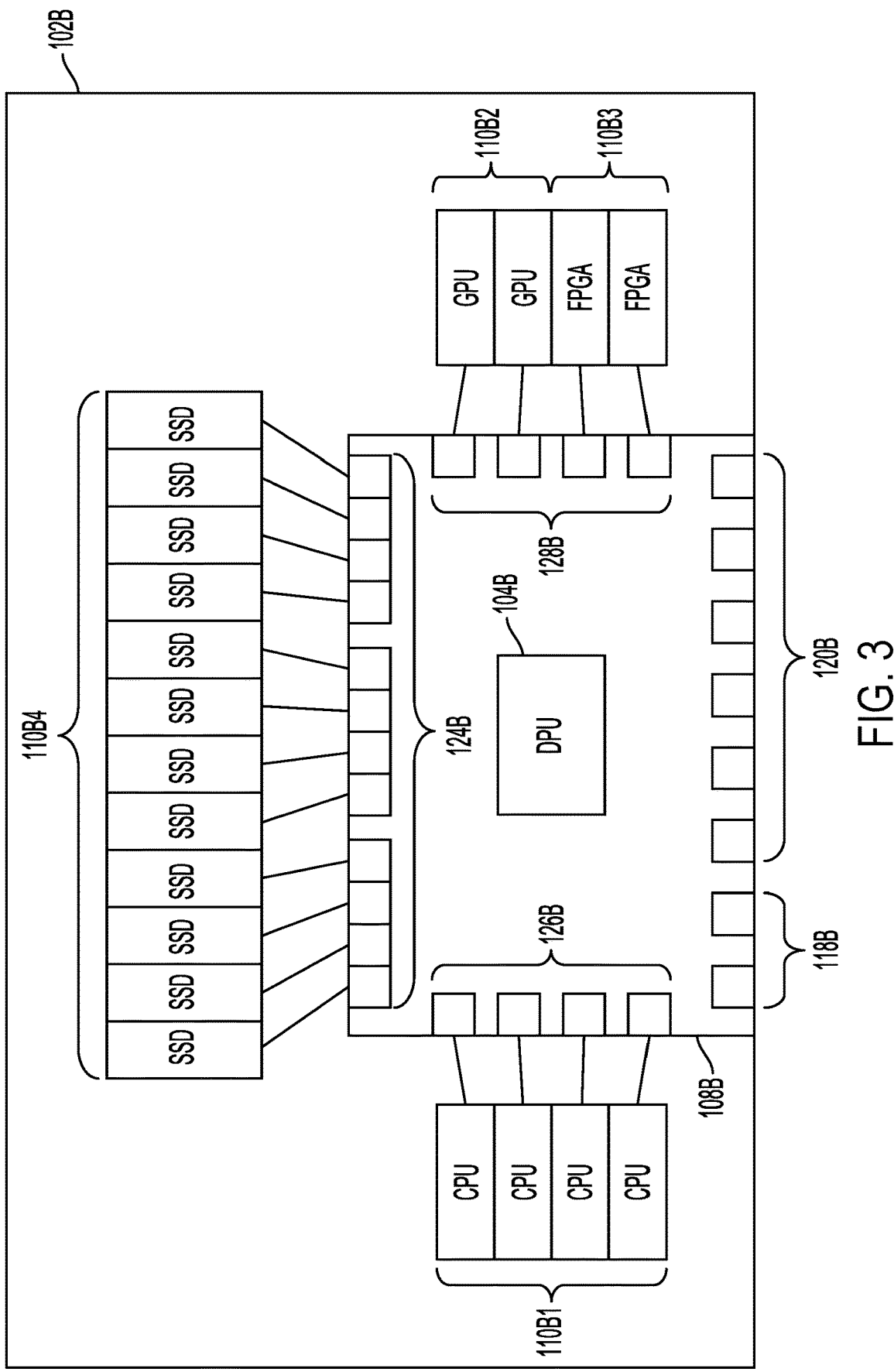
FIG. 3 is an example block diagram of a network device including a Data Processing Unit (DPU) as part of a network interface according to one or more embodiments.

FIG. 3 is an example block diagram of network device 102B including DPU 104B as part of network interface 108B according to one or more embodiments. DPU 104B can include, for example, an Mellanox BlueField-2 DPU, that can be configured to handle packet or message processing.

As shown in FIG. 3, resources 110B of network device 102B include locally connected internal devices, such as CPUs 110B1, GPUs 110B2, FPGAs 110B3, and SSDs 110B4. Network interface 108B is configured to communicate with resources 110B via internal data path ports 126B for CPUs 110B1, internal data path ports 124B for SSDs 110B4, and internal data path ports 128B for GPUs 110B2 and FPGAs 110B3. Internal data path ports 124B, 126B, and 128B can include, for example, PCIe or Ethernet ports.

Network interface 108B uses control path ports 118B for communicating with devices or hosts external to network device 102B. DPU 104B publishes control path ports 118B on the network, but does not publish or expose data path ports 120B. In handling requests from hosts to establish a connection, DPU 104B allocates a locally connected internal device to the host requesting a connection from among resources 110B. DPU 104B may allocate the locally connected internal device, based on at least one of, for example, a storage protocol, a message type, a level of resource availability, and a priority indicated by the host, such as a minimum QoS.

In addition, DPU 104B determines a data path port from among data path ports 120B for communication between the host and the allocated locally connected internal device. In some implementations, DPU 104B may use a reserved data path port 120B for the data path communication with the allocated internal device or resource. In other implementations, DPU 104B may use a single data path port 120B for connections with multiple hosts and/or internal devices (i.e., resources 110B). The binding of ports by DPU 104B may be dynamic. In this regard, and as discussed in more detail below with the data path update process of FIG. 6, DPU 104B may determine a new data path port from among data path ports 120B in response to receiving an indication from a host that a previously determined data path has failed.

Figure 4:
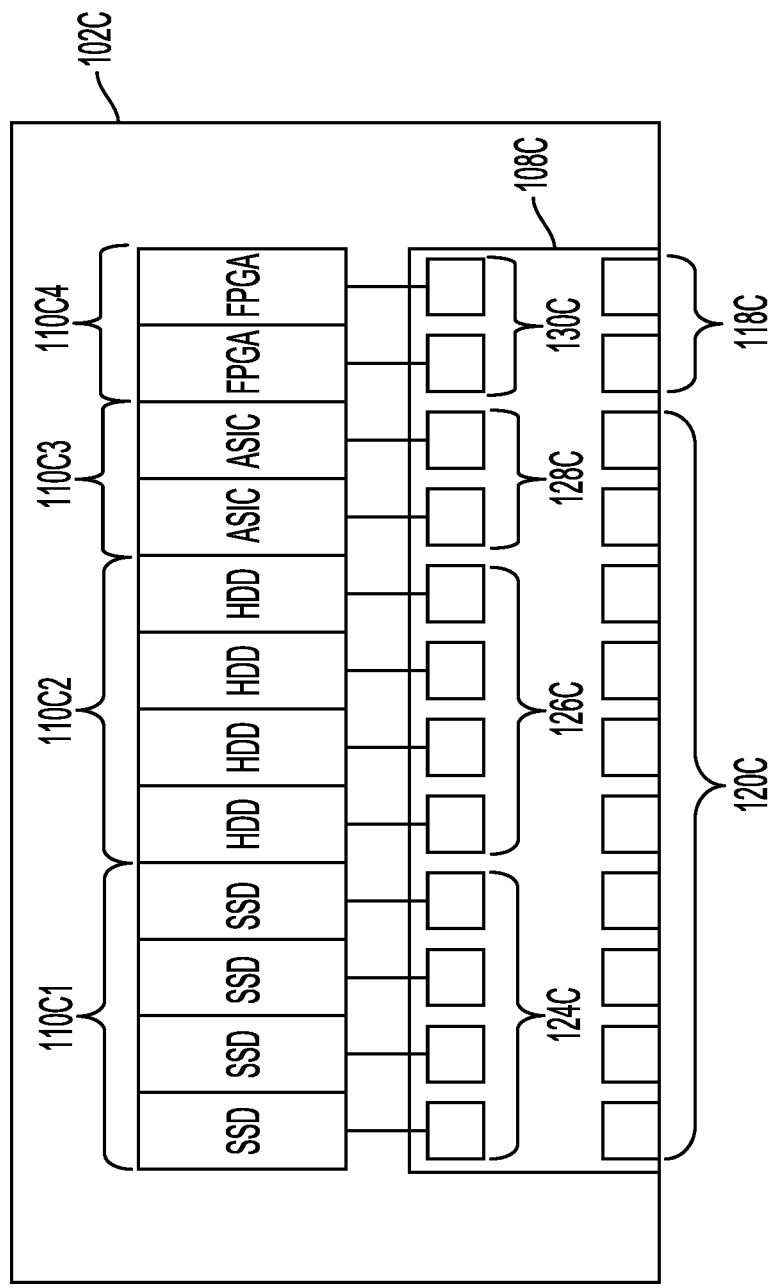
FIG. 4 is an example block diagram of a network device including a programmable switch as a network interface according to one or more embodiments.

FIG. 4 is an example block diagram of network device 102C including programmable switch 108C as a network interface according to one or more embodiments. Programmable switch 108C can include, for example, a Barefoot Networks Tofino P4 programmable switch, or other type of programmable switch.

As shown in FIG. 4, resources 110C of network device 102C include locally connected DSDs, such as SSDs 110C1 and HDDs 110C2, and processors, such as ASICs 110C3 and FPGAs 110C4. Programmable switch 108C is configured to communicate with resources 110C via internal data path ports 124C for SSDs 110C1, internal data path ports 126C for HDDs 110C2, internal data path ports 128C for ASICs 110C3, and internal data path ports 130C for FPGAs 110C4. Internal data path ports 124C, 126C, 128C, and 130C can include, for example, Ethernet ports.

Programmable switch 108C uses control path ports 118C for communicating with devices or hosts external to network device 102C. Programmable switch 108C publishes control path ports 118C on the network, but does not publish or expose data path ports 120C. In handling requests from hosts to establish a connection, programmable switch 108C allocates a locally connected internal device to the host requesting a connection from among the locally connected internal devices of resources 110C. Programmable switch 108C may allocate the locally connected internal device, based on at least one of, for example, a storage protocol, a message type, a level of resource availability, and a priority indicated by the host, such as a minimum QoS.

In addition, programmable switch 108C determines a data path port from among data path ports 120C for communication between the host and the allocated internal device or resource. In some implementations, programmable switch 108C may use a reserved data path port 120C for the data path communication with the allocated internal device or resource. In other implementations, programmable switch 108C may use a single data path port 120C for connections with multiple hosts and/or internal devices (i.e., resources 110C). The binding of ports by programmable switch 108C may be dynamic. In this regard, and as discussed in more detail below with the data path update process of FIG. 6, programmable switch 108C may determine a new data path port from among data path ports 120C in response to receiving an indication from a host that a previously determined data path has failed.

Example Processes

Figure 5:
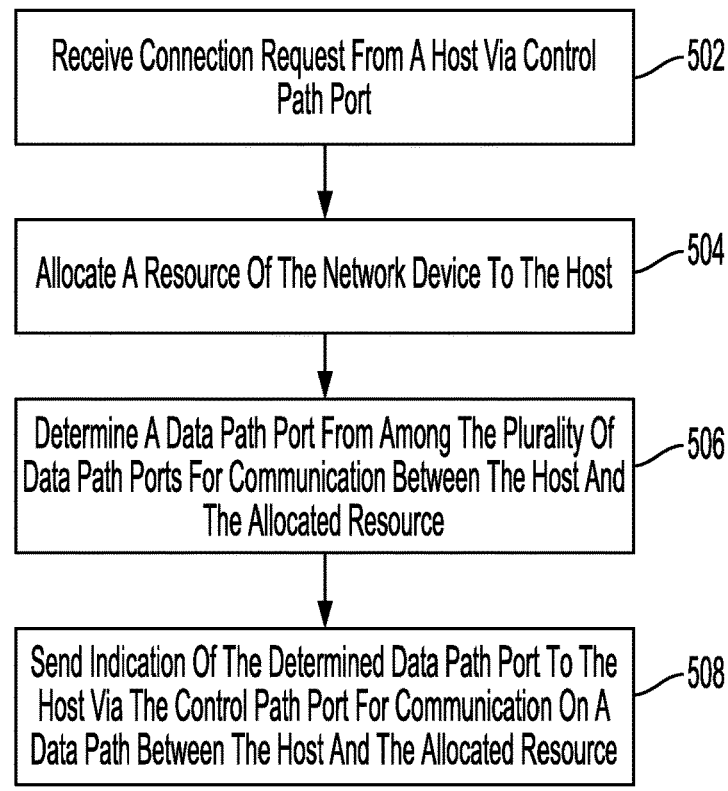
FIG. 5 is a flowchart for a data path setup process according to one or more embodiments.

FIG. 5 is a flowchart for a data path setup process according to one or more embodiments. The process of FIG. 5 can be performed by, for example, circuitry of a network device executing target driver 10, such as circuitry 104A in FIG. 2, DPU 104B in FIG. 3, or programmable switch 108C in FIG. 4.

In block 502, the circuitry receives a connection request from a host via a control path port. The connection request can include, for example, a TCP and/or NVMeoF connection request. As discussed above, the network device includes at least one dedicated control path port for control path communications for managing connection setup and connection teardown. The one or more control path ports may also be used for other control plane or connection management operations, such as device discovery (e.g., NVMe discovery) and/or error handling.

In block 504, the circuitry of the network device allocates a resource of the network device to the host based on the received connection request. The allocated resource can include, for example, a hardware resource of the network device, such as a CPU, GPU, ASIC, memory (e.g., DRAM or SCM), or DSD (e.g., SSD or HDD), or may include a software resource of the network device, such as a spawned process or application executing on a processor of the network device. In allocating the resource, the circuitry may consider factors such as the relative availability or activity level of the resource (e.g., an available bandwidth, traffic level, or number of pending messages or commands), a message type indicated by the connection request (e.g., an NVMe capsule included in the connection request), a storage protocol indicated by the connection request, and/or a priority indicated by the connection request (e.g., an 802.1Q bb value).

In block 506, the circuitry determines a data path port from among a plurality of data path ports for communication between the host and the allocated resource. The determined data path port may be statically assigned to the allocated resource or may be dynamically assigned by the circuitry to the allocated resource. In some implementations, the circuitry may use a single port for multiple concurrent data paths between different hosts and allocated resources.

In block 508, the circuitry sends an indication of the determined data path port to the host via the control path port to establish the data path connection. In some implementations, the indication of the determined data path port can include, for example, a port address or identifier for the previously unpublished data path port. The host may then use a host driver (e.g., host driver 12 in FIG. 1) executing at the host to begin data path communication with the network device via the determined data path port.

Those of ordinary skill in the art will appreciate that other implementations of the data path setup process may include blocks in a different order than shown in FIG. 5. For example, the determination of a data path port in block 506 may occur before or concurrently with the allocation of a resource in block 504 in some implementations.

Figure 6:
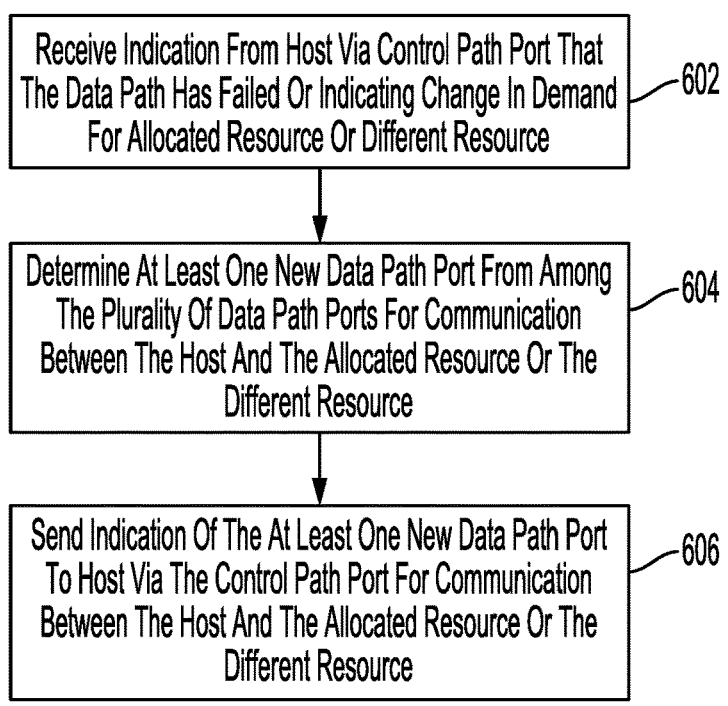
FIG. 6 is a flowchart for a data path update process according to one or more embodiments.

FIG. 6 is a flowchart for a data path update process according to one or more embodiments. The process of FIG. 6 can be performed by, for example, circuitry 104 of a network device executing target driver 10, such as circuitry 104A in FIG. 2, DPU 104B in FIG. 3, or programmable switch 108C in FIG. 4.

In block 602, the circuitry receives an indication from a host via a control path port that a data path has failed or indicating a change in demand for an allocated resource or for a different resource of the network device. In the case of a data path failure, the indication may be an error message or other indication of the failed data path. In this regard, the use of separate control path ports and data path ports can ordinarily improve the reliability of the network device by providing a separate path for indicating the failure of the data path.

In the case of a change in demand for the allocated resource or fora different resource, the host and the network device can use the control path to negotiate new connection parameters to dynamically adjust throughput and/or bandwidth for resources of the network device. For example, host 102A in FIG. 1 may send an indication to network device 112A in FIG. 2 via a control path port 118A that an application executing at host 102A requires a higher QoS to a previously allocated resource of network device 102A or that an application executing at host 102A is requesting access to a different resource of network device 102A.

In block 604, the circuitry determines at least one new data path port from among the plurality of data path ports for communication between the host and the allocated resource or the different resource. The circuitry of the network device may keep track of active connections including, for example, an indication of the host that requested the connection, the resource or resources allocated to the host, and the port originally assigned or determined for a data path. The circuitry may then determine one or more new data path ports to improve the QoS or to restore a failed data path for a previously allocated resource, or to provide access to a different resource based on, for example, availability of the data path ports, or levels of traffic being handled by the data path ports. In some implementations, the circuitry may also test a previously assigned data path port to determine if the data path port has failed and should be removed from a list of available data path ports used by the circuitry.

After determining the new data path port, the circuitry sends an indication of the at least one new data path port, such as a port address or other identifier, to the host in block 606 via the control path port. The host can then use the new data path port or ports to communicate with the allocated resource or the different resource.

Figure 7:
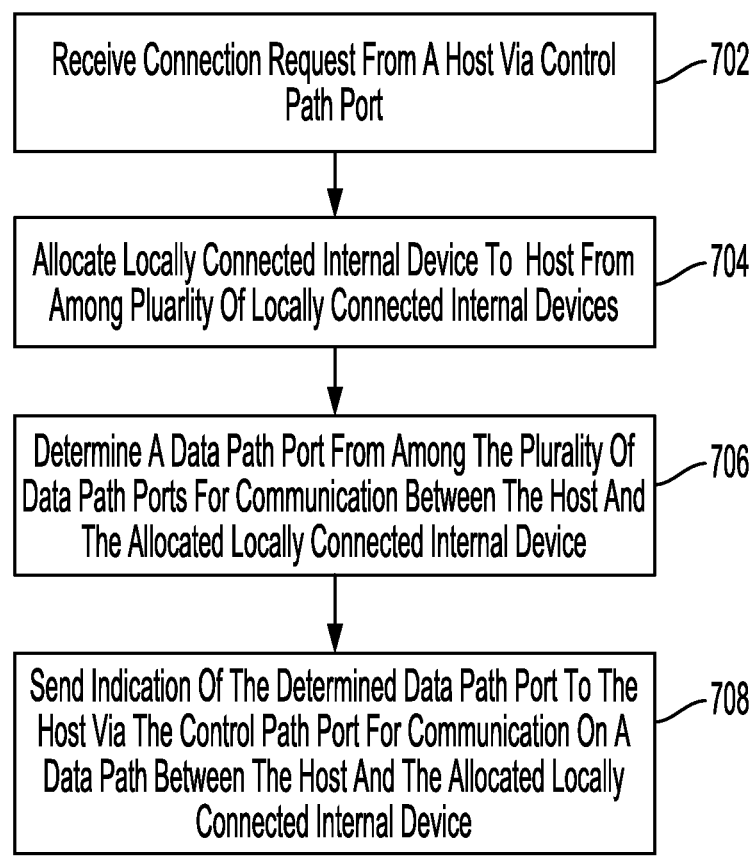
FIG. 7 is a flowchart for a data path setup process performed by a network interface of a network device according to one or more embodiments.

FIG. 7 is a flowchart for a data path setup process performed by a network interface of a network device according to one or more embodiments. The process of FIG. 7 can be performed by, for example, circuitry 104 of a network interface 108 executing target driver 10 such as circuitry 104A in FIG. 2, DPU 104B in FIG. 3, or programmable switch 108C in FIG. 4.

In block 702, the circuitry receives a connection request from a host via a control path port. The connection request can include, for example, a TCP and/or NVMeoF connection request. As discussed above, the network device includes at least one dedicated control path port for control path communications for managing connection setup and connection teardown. The one or more control path ports may also be used for other control plane or connection management operations, such as device discovery (e.g., NVMe discovery) and/or error handling.

In block 704, the circuitry of the network device allocates a locally connected internal device of the network device to the host from among a plurality of locally connected internal devices of the network device. The allocated internal device can include, for example, a hardware resource of the network device, such as a CPU, GPU, ASIC, memory (e.g., DRAM or SCM), or DSD (e.g., SSD or HDD). In allocating the internal device, the circuitry may consider factors such as the relative availability or activity of the internal device (e.g., an available bandwidth, traffic level, or number of pending messages or commands), a message type indicated by the connection request (e.g., an NVMe capsule included in the connection request), a storage protocol indicated by the connection request, and/or a priority indicated by the connection request (e.g., an 802.1 Qbb value).

In block 706, the circuitry determines a data path port from among a plurality of data path ports for communication between the host and the allocated internal device. The determined data path port may be statically assigned to the allocated internal device or may be dynamically assigned by the circuitry to the allocated internal device. In some implementations, the circuitry may use a single port for multiple concurrent data paths between different hosts and allocated resources, such as internal devices.

In block 708, the circuitry sends an indication of the determined data path port to the host via the control path port to establish the data path connection. In some implementations, the indication of the determined data path port can include, for example, a port address or identifier for the previously unpublished data path port. The host may then use a host driver (e.g., host driver 12 in FIG. 1) executing at the host to begin data path communication with the network device via the determined data path port.

Those of ordinary skill in the art will appreciate that other implementations of the data path setup process may include blocks in a different order than shown in FIG. 7. For example, the determination of a data path port in block 706 may occur before or concurrently with the allocation of an internal device in block 704 in some implementations.

As discussed above, the use of separate control paths and data paths for a network device can ordinarily improve the throughput and bandwidth of the network device by reducing the likelihood that the control plane processing will become a bottleneck. In addition, the separate management of data paths from control paths and allocation of resources of the network device can better balance workloads and traffic for the allocated resources, resulting in higher performance in terms of Input/Output Operations Per Second (IOPS) and High Availability (HA). In this regard, the separate control path can improve fault tolerance or failure recovery by providing a dedicated control path for quickly communicating the failure of a data path.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general-purpose processor, a GPU, a DPU, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A network device, comprising:
   at least one control path port configured to communicate on a network external to the network device, wherein the at least one control path port is reserved for control plane operations via the network;
   a plurality of data path ports configured to communicate on the network, wherein the plurality of data path ports is reserved for data plane operations via the network; and
   circuitry configured to:
      receive a connection request from a host via a control path port of the at least one control path port;
      allocate a resource of the network device to the host;
      determine a data path port from among the plurality of data path ports for communication between the host and the allocated resource; and
      send an indication of the determined data path port to the host via the control path port for communication on a data path between the host and the allocated resource.

2. The network device of claim 1, wherein the circuitry is further configured to provide, using the control path port, control plane operations including at least one of device discovery, connection teardown, error handling, and negotiating connection parameters.

3. The network device of claim 1, wherein the circuitry is further configured to allocate the resource based on at least one of a message type indicated by the host via the control path port and a storage protocol indicated by the host via the control path port.

4. The network device of claim 1, wherein the circuitry is further configured to allocate the resource based on at least one of a priority indicated by the host via the control path port and an activity level of the resource.

5. The network device of claim 1, wherein the circuitry is further configured to:
   receive an indication from the host via the control path port that the data path has failed or indicating a change in demand for the allocated resource or a different resource of the network device; and
   in response to the received indication, determine at least one new data path port from among the plurality of data path ports for communication between the host and the allocated resource or the different resource.

6. The network device of claim 1, wherein the circuitry is further configured to provide, using the determined data path port, data plane operations including at least one of sending packets including data payloads to the host via the network and receiving packets including data payloads from the host via the network.

7. The network device of claim 1, wherein the network device includes a server or a compute node on the network.

8. The network device of claim 1, wherein the allocated resource includes at least one of a data storage device of the network device, a processor of the network device, a memory of the network device, and a process or application executing on a processor of the network device.

9. A method performed by a network device, the method comprising:
   receiving a connection request from a host via a control path port of the network device wherein the control path port is reserved for control plane operations via a network external to the network device;
   allocating a resource of the network device to the host;
   determining a data path port of the network device for communication between the host and the allocated resource, wherein the determined data path port is reserved for data plane operations via the network; and
   sending an indication of the determined data path port to the host via the control path port for communication on a data path between the host and the allocated resource.

10. The method of claim 9, further comprising performing control plane operations including at least one of device discovery, connection teardown, error handling, and negotiating connection parameters using the control path port.

11. The method of claim 9, further comprising allocating the resource based on at least one of a message type indicated by the host via the control path port and a storage protocol indicated by the host via the control path port.

12. The method of claim 9, further comprising allocating the resource based on at least one of a priority indicated by the host via the control path port and an activity level of the resource.

13. The method of claim 9, further comprising:
receiving an indication from the host via the control path port that the data path has failed or indicating a change in demand for the allocated resource or a different resource of the network device; and
in response to the received indication, determining at least one new data path port from among a plurality of data path ports of the network device for communication between the host and the allocated resource or the different resource.

14. The method of claim 9, further comprising providing, using the determined data path port, data plane operations including at least one of sending packets including data payloads to the host via the network and receiving packets including data payloads from the host via the network.

15. The method of claim 9, wherein the network device includes a server or a compute node on the network.

16. The method of claim 9, wherein the allocated resource includes at least one of a data storage device of the network device, a processor of the network device, a memory of the network device, and a process or application executing on a processor of the network device.

17. A network interface, comprising:
at least one control path port configured to communicate on a network external to the network interface, wherein the at least one control path port is reserved for control plane operations via the network;
a first plurality of data path ports configured to communicate on the network, wherein the first plurality of data path ports is reserved for data plane operations via the network;
a second plurality of data path ports configured to communicate with a plurality of locally connected devices; and
means for:
receiving a connection request from a host via a control path port of the at least one control path port;
allocating a locally connected device to the host from among the plurality of locally connected devices;
determining a data path port from among the first plurality of data path ports for communication between the host and the allocated locally connected device; and
sending an indication of the determined data path port to the host via the control path port for communication on a data path between the host and the allocated locally connected device.

18. The network interface of claim 17, further comprising means for performing, using the control path port, control plane operations including at least one of device discovery, connection teardown, error handling, and negotiating connection parameters using the control path port.

19. The network interface of claim 17, further comprising means for allocating the locally connected device based on at least one of a storage protocol indicated by the host via the control path port, a message type indicated by the host via the control path port, a priority indicated by the host via the control path port, and an activity level of the locally connected internal device.

20. The network interface of claim 17, wherein the network interface includes an Ethernet switch, a Data Processing Unit (DPU), a Peripheral Component Interconnect express (PCIe) switch, or a router.

\* \* \* \* \*